US008743896B2

(12) United States Patent
Wu

(10) Patent No.: US 8,743,896 B2
(45) Date of Patent: Jun. 3, 2014

(54) METHOD AND RELATED COMMUNICATION DEVICE FOR RADIO LINK CONTROL RECONFIGURATION IN A WIRELESS COMMUNICATIONS SYSTEM

(75) Inventor: Chih-Hsiang Wu, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 669 days.

(21) Appl. No.: 12/604,360

(22) Filed: Oct. 22, 2009

(65) Prior Publication Data

US 2010/0232376 A1 Sep. 16, 2010

Related U.S. Application Data

(60) Provisional application No. 61/160,352, filed on Mar. 16, 2009.

(51) Int. Cl.
*H04L 12/28* (2006.01)

(52) U.S. Cl.
USPC .......... 370/431

(58) Field of Classification Search
USPC .......... 370/310–350, 431–463
See application file for complete search history.

(56) References Cited

U.S. PATENT DOCUMENTS

| | | | | |
|---|---|---|---|---|
| 7,227,856 | B2 * | 6/2007 | Wu | 370/346 |
| 7,940,770 | B2 * | 5/2011 | Moon et al. | 370/394 |
| 8,315,182 | B2 * | 11/2012 | Wu | 370/252 |
| 2005/0176437 | A1 | 8/2005 | Mir | |
| 2007/0133456 | A1 * | 6/2007 | Ding | 370/328 |
| 2008/0049754 | A1 * | 2/2008 | Kim et al. | 370/394 |
| 2008/0188224 | A1 | 8/2008 | Pani | |
| 2008/0225893 | A1 * | 9/2008 | Cave et al. | 370/476 |
| 2008/0227442 | A1 * | 9/2008 | Pani et al. | 455/422.1 |
| 2009/0175163 | A1 * | 7/2009 | Sammour et al. | 370/216 |
| 2010/0197230 | A1 * | 8/2010 | Charles et al. | 455/63.1 |

FOREIGN PATENT DOCUMENTS

| | | | |
|---|---|---|---|
| CN | 1771686 | A | 5/2006 |
| WO | 2004091130 | A1 | 10/2004 |

OTHER PUBLICATIONS

Ericsson: “Discussion on MAC reset and reconfiguration”, TSG-RAN WG2 Meeting #62bis, R2-083142, Jun. 30-Jul. 4, 2008, pp. 1-2, XP050140574, Warsaw, Poland.
Asustek: “Reconfiguration of MAC-hs parameters”, 3GPP TSG-RAN2 Meeting #47, R2-051533, May 9-13, 2005, pp. 1-3, XP050128717, Athens, Greece.
Ericsson: “Text proposal on MAC reset and reconfiguration”, 3GPP TSG-RAN2 Meeting #62bis, R2-083143, Jun. 30-Jul. 4, 2008, XP050140575, Warsaw, Poland.
HTC Corporation: “Clarification on RLC reconfiguration”, 3GPP TSG-RAN2 Meeting #65bis, R2-092363, Mar. 23-27, 2009, XP050340099, Seoul, Korea.
3GPP, 3GPP TS 25.322 V8.3.0 Radio Link Control (RLC) protocol specification, Sep. 2008.
3GPP, 3GPP TSG-RAN2 Meeting #65 R2-091971, Feb. 2009.

(Continued)

*Primary Examiner* — Fan Ng
(74) *Attorney, Agent, or Firm* — Winston Hsu; Scott Margo

(57) ABSTRACT

A method of RLC reconfiguration for a communication device of a wireless communication system includes receiving a dedicated signaling including a reconfiguration value corresponding to a RLC-related parameter when the RLC-related parameter is in-use, and not immediately starting to use the reconfiguration value on the in-use RLC-related parameter when the reconfiguration value is extracted from the dedicated signaling.

26 Claims, 13 Drawing Sheets

10

Network

Communication device ..... Communication device ..... Communication device

(56) References Cited

OTHER PUBLICATIONS

Office action mailed on Apr. 16, 2012 for the China application No. 201010135843.4, filing date Mar. 16, 2010, p. 1-5.

HTC Corporation, Clarification on RLC reconfiguration, 3GPP TSG-RAN WG2 #65bis, R2-092362, Seoul, Korea, Mar. 23-27, 2009, P1-P3.

Office action mailed on Mar. 6, 2012 for the Japanese application No. 2010-057335, filing date Mar. 15, 2010, p. 1-2.

* cited by examiner

METHOD AND RELATED COMMUNICATION DEVICE FOR RADIO LINK CONTROL RECONFIGURATION IN A WIRELESS COMMUNICATIONS SYSTEM

CROSS REFERENCE TO RELATED APPLICATIONS

This application claims the benefit of U.S. Provisional Application No. 61/160,352, filed on Mar. 16, 2009 and entitled "Methods and Apparatus for Handling RLC-related Parameter Reconfiguration in Wireless Communications System" the contents of which are incorporated herein.

BACKGROUND OF THE INVENTION

1. Field of the Invention

The present invention relates to a method utilized in a wireless communication and communication device thereof, and more particularly, to a method of reconfiguring parameters of a radio link control layer and parameters of related logical channels in a wireless communication system and communication device thereof 2. Description of the Prior Art A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile stations, also referred as user equipments (UEs).

A radio interface protocol of the LTE system includes three layers: the Physical Layer (L1), the Data Link Layer (L2), and the Network Layer (L3), wherein a control plane of L3 is a Radio Resource Control (RRC) layer, and L2 is further divided into a Packet Data Convergence Protocol (PDCP) layer, a Radio Link Control (RLC) layer and a Medium Access Control (MAC) layer.

The main services and functions of the RLC layer include Transfer of upper layer PDUs; Error Correction through ARQ (only for Acknowledged Mode data transfer); Concatenation, segmentation and reassembly of RLC SDUs (only for Unacknowledged Mode and Acknowledged Mode data transfer); Re-segmentation of RLC data PDUs (only for Acknowledged Mode data transfer); In sequence delivery of upper layer PDUs (only for Unacknowledged Mode and Acknowledged Mode data transfer); Duplicate detection (only for Unacknowledged Mode and Acknowledged Mode data transfer); Protocol error detection and recovery; RLC SDU discard (only for Unacknowledged Mode and Acknowledged Mode data transfer); and RLC re-establishment.

Various RLC layer parameters, such as timers and counters, are employed for the abovementioned functions/services and are configured or reconfigured by the RRC layer. In RRC (re)configuration, the RLC layer parameters are grouped into a "RLC-Config" information element (IE) that can refer to a document 3GPP TSG-RAN2 Meeting #65 R2-091971.

Logical channel are used for the RLC layer to communicate with the MAC layer. For arrangement of data priority and amount, each logical channel is configured with parameters related to transmission priority and a prioritized bit rate. Various logical channel parameters are also configured or reconfigured by the RRC layer and grouped into a "Logical-ChannelConfig" IE that can refer to the document 3GPP TSG-RAN2 Meeting #65 R2-091971.

The abovementioned RLC layer parameters and logical channel parameters are considered RLC-related parameters herein. The UE starts using a reconfigured value of a RLC parameter when the RLC parameter is reconfigured by the upper layer. Furthermore, the UE may receive the "RLC-Config" or "LogicalChannelConfig" IE when the RLC-related parameters are in use. In this situation, the UE immediately uses the reconfigured value on the in-use RLC-related parameter. However, changing a value of the in-use RLC-related parameter can cause UE system failure or impacts communication system performance.

For example, a RLC counter configured with a maximum value M1 is in a counting state for a RLC procedure. During the counting of the RLC counter, the UE receives reconfiguration indicating a new maximum value M2 for the RLC counter. If M2>M1 and the UE immediately replaces M1 with M2, the RLC counter becomes being allowed to count up to M2 for the RLC procedure. Performance of the RLC procedure is affected. Improper maximum value setting can cause RLC errors.

SUMMARY OF THE INVENTION

Therefore, the present invention provides a method of reconfiguring RLC-related parameters in a wireless communication system and related communication device so at to solve the abovementioned problems.

According to an aspect of the present invention, a method of RLC reconfiguration for a communication device of a wireless communication system includes receiving a dedicated signaling including a reconfiguration value corresponding to a RLC-related parameter when the RLC-related parameter is in-use, and not immediately starting to use the reconfiguration value on the in-use RLC-related parameter when the reconfiguration value is extracted from the dedicated signaling.

According to another aspect of the present invention, a communication device of a wireless communication system for accurately performing RLC reconfiguration includes a computer readable recording medium for storing program code corresponding to a process, and a processor coupled to the computer readable recording medium, for processing the program code to execute the process. The process includes receiving a dedicated signaling including a reconfiguration value corresponding to a RLC-related parameter when the RLC-related parameter is in-use, and not immediately starting to use the reconfiguration value on the in-use RLC-related parameter when the reconfiguration value is extracted from the dedicated signaling.

According to another aspect of the present invention, a communication device of a wireless communication system for accurately performing RLC reconfiguration includes a receiving unit and a reconfiguring unit. The receiving unit is used for receiving a dedicated signaling including a reconfiguration value corresponding to a RLC-related parameter when the RLC-related parameter is in-use. The reconfiguring unit is used for not immediately starting to use the reconfiguration value on the in-use RLC-related parameter when the reconfiguration value is extracted from the dedicated signaling.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
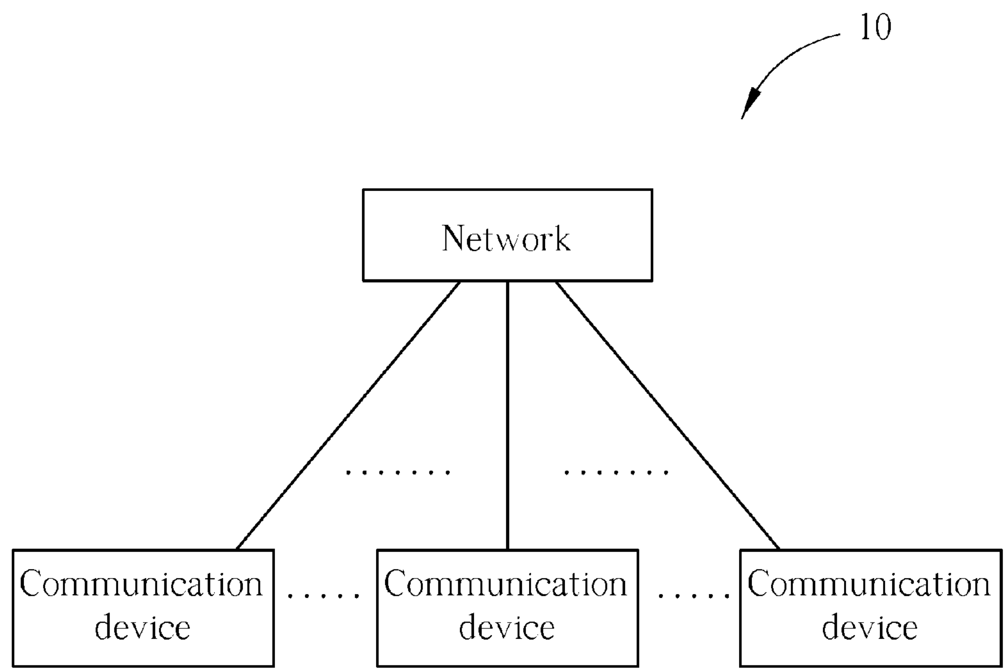
FIG. 1 is a schematic diagram of a wireless communication system.

Please refer to FIG. 1, which illustrates a schematic diagram of a wireless communication system 10 according to an embodiment of the present invention. Briefly, the wireless communication system 10 is composed of a network and a plurality of communication devices. In FIG. 1, the network and the communication devices are simply utilized for illustrating the structure of the wireless communication system 10. The wireless communication system 10 can be a UMTS (Universal Mobile Telecommunications System) or an LTE (long-term evolution) system. In the LTE system, the network is referred as a EUTRAN (evolved-UTRAN) comprising a plurality of eNBs, whereas the communication devices are referred as user equipments (UEs). The UEs can be devices such as mobile phones, computer systems, etc. Besides, the network and the UE can be seen as a transmitter or receiver according to transmission direction, e.g., for uplink (UL), the UE is the transmitter and the network is the receiver, and for downlink (DL), the network is the transmitter and the UE is the receiver.

Figure 2:
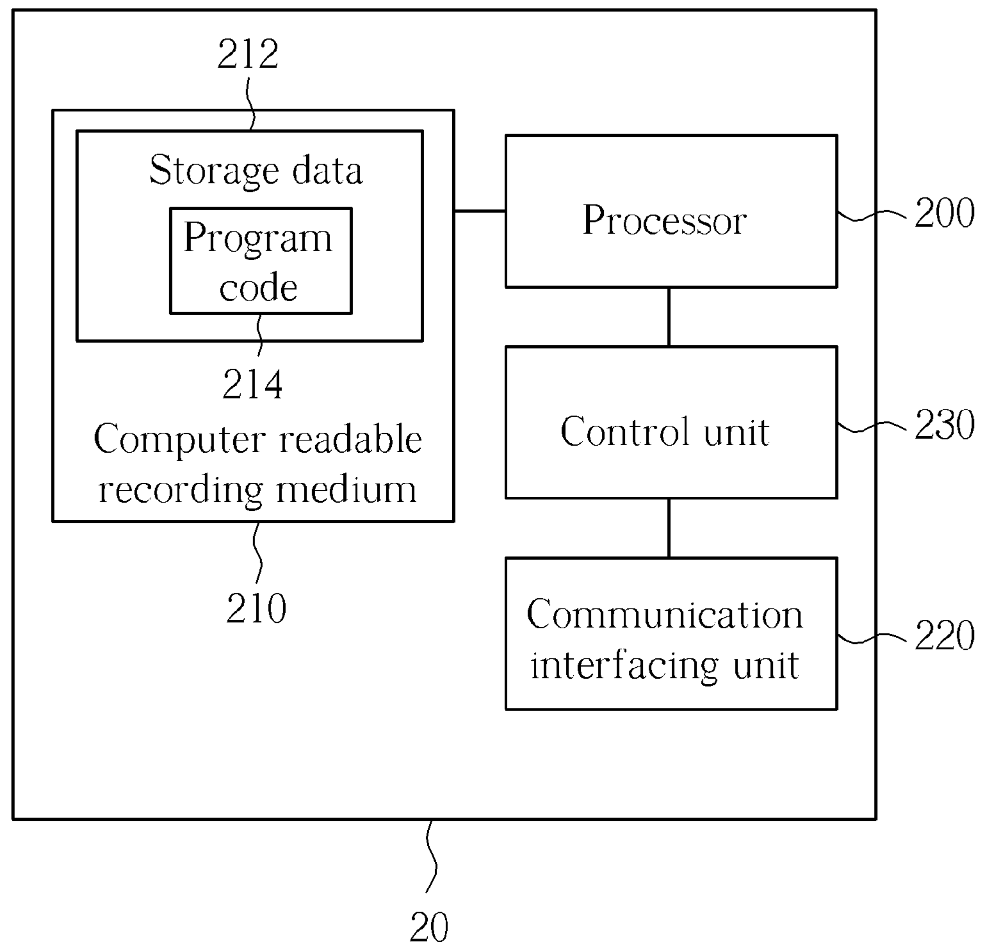
FIG. 2 is a schematic diagram of a communication device according to an embodiment of the present invention.

Please refer to FIG. 2, which illustrates a schematic diagram of a communication device 20 according to an embodiment of the present invention. The communication device 20 can be the communication devices shown in FIG. 1 and includes a processor 200, a computer readable recording medium 210, a communication interfacing unit 220 and a control unit 230. The computer readable recording medium 210 is any data storage device that includes program code 214, thereafter read and processed by the processor 200. Examples of the computer readable recording medium 210 include a subscriber identity module (SIM), read-only memory (ROM), random-access memory (RAM), CD-ROMs, magnetic tapes, hard disks, optical data storage devices, and carrier waves (such as data transmission through the Internet). The control unit 230 controls the communication interfacing unit 220 and related operations and states of the communication device 20 according to processing results of the processor 200. The communication interfacing unit 220 is preferably a radio transceiver and accordingly exchanges wireless signals with the network.

Figure 3:
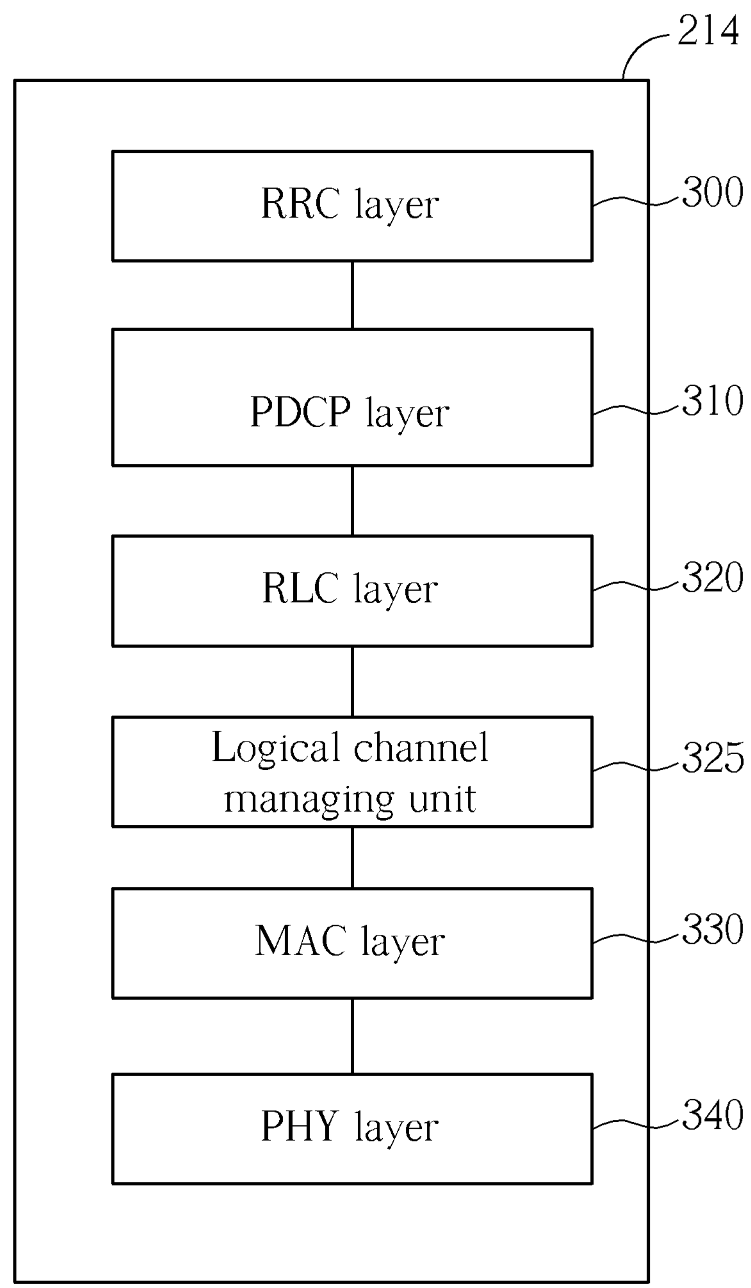
FIG. 3 is a schematic diagram of multiple communications protocol layers.

Please refer to FIG. 3, which illustrates a schematic diagram of multiple communications protocol layers of the LTE system applied by the program code 214 according to an embodiment of the present invention. The program code 214 includes program code of multiple communications protocol layers, which from top to bottom are a radio resource control (RRC) layer 300, a packet data convergence protocol (PDCP) layer 310, a radio link control (RLC) layer 320, a logical channel managing unit 325, a medium access control (MAC) layer 330 and a physical (PHY) layer 340.

The RLC layer 320 can operate with three types of RLC entities: Transparent Mode (TM), Unacknowledged Mode (UM), and Acknowledged Mode (AM) types. Logical channels are defined between the RLC layer 320 and the MAC layer 330 and are managed by the logical channel managing unit 325 for packet data transfer, channel prioritization, a channel data rate, etc. The MAC layer 330 is capable of performing buffer status report (BSR) reporting which functions to obtain RLC data amount available for uplink transmission. The RRC layer 300 extracts reconfiguration information from dedicated signaling sent by the network and further submits the extracted reconfiguration information to the lower layers. For the LTE system, a RRC connection reconfiguration message is used as the dedicated signaling to employ "RLC-Config" and "LogicalChannelConfig" information elements (IEs) which are used as reconfiguration information for the RLC layer 320 and logical channels respectively.

When the network attempts to reconfigure radio link control operation of the communication device 20, the network can send an RRC connection reconfiguration message including the "RLC-Config" and/or "LogicalChannelConfig" IE to the communication device 20. The RRC layer 300 extracts the IE(s) from the RRC connection reconfiguration message and further extracts parameter values, such as values of timer and counter, from the IE(s). The extracted values are then submitted to the RLC layer 320 and/or the logical channel managing unit 325 for parameter reconfiguration. For LTE system, reconfiguration parameters for the parameters (e.g. a timer, a counter, a variable) used in the RLC layer 320 and logical channel managing unit 325 can refer to the "RLC-Config" and/or "LogicalChannelConfig" IEs specified by 3GPP TSG-RAN2 Meeting #65 R2-091971.

In the following embodiments, processes of not immediately starting to use the reconfiguration values on the in-use parameters when the reconfiguration values are obtained are provided to prevent system errors. Parameters in the following embodiments are considered the parameters used for the RLC layer or logical channels, as well as RLC-related parameters.

Figure 4:
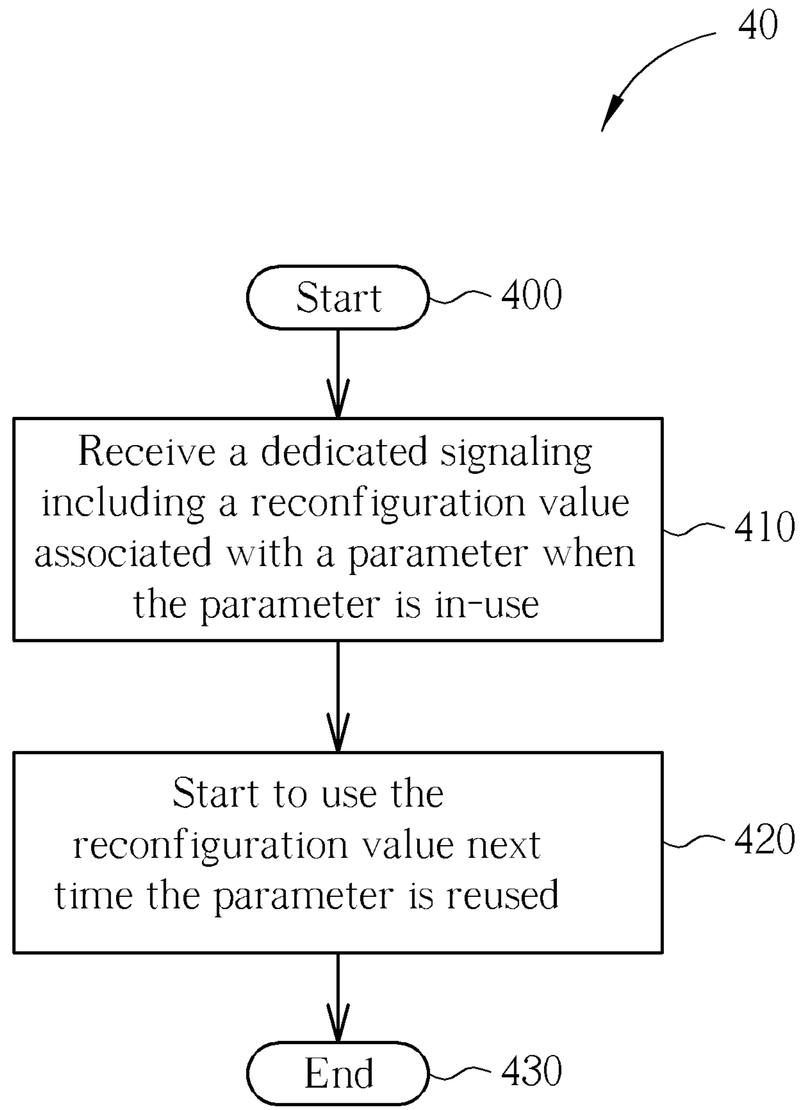
FIGS. 4-12 are flowcharts of processes according to embodiments of the present invention.

Please refer to FIG. 4, which illustrates a flowchart of a process 40 according to an embodiment of the present invention. The process 40 is utilized for RLC reconfiguration for a UE of a wireless communication system. The process 40 can be compiled into the program code 214 and includes the following steps:

Step 400: Start.

Step 410: Receive a dedicated signaling including a reconfiguration value associated with a parameter when the parameter is in-use.

Step 420: Start to use the reconfiguration value next time the parameter is reused.

Step 430: End.

According to the process 40, when the dedicated signaling is received during the in-use of parameter, the reconfiguration value is started to be used next time the parameter is reused. In other words, the UE first waits for finish of the currently-used parameter and configures the parameter with the reconfiguration value when the parameter is used again.

Take a timer for example. The UE sets the timer according to the reconfiguration value next time the timer is started or restarted. That is, the UE obtains a reconfiguration value before expiry of the timer and then applies the reconfiguration value for the timer when the timer is started to run again after this expiry of the timer. The same concept can also be adopted for a counter. The UE sets the counter according to the reconfiguration value next time the counter is reset to a predetermined initial value (e.g. a default value).

As can be seen from the process 40, the UE does not unconditionally start to use the reconfiguration value immediately when the reconfiguration value is received. Thus, enforcement of a value change of the in-use parameter is eliminated, thereby avoiding system errors.

Figure 5:
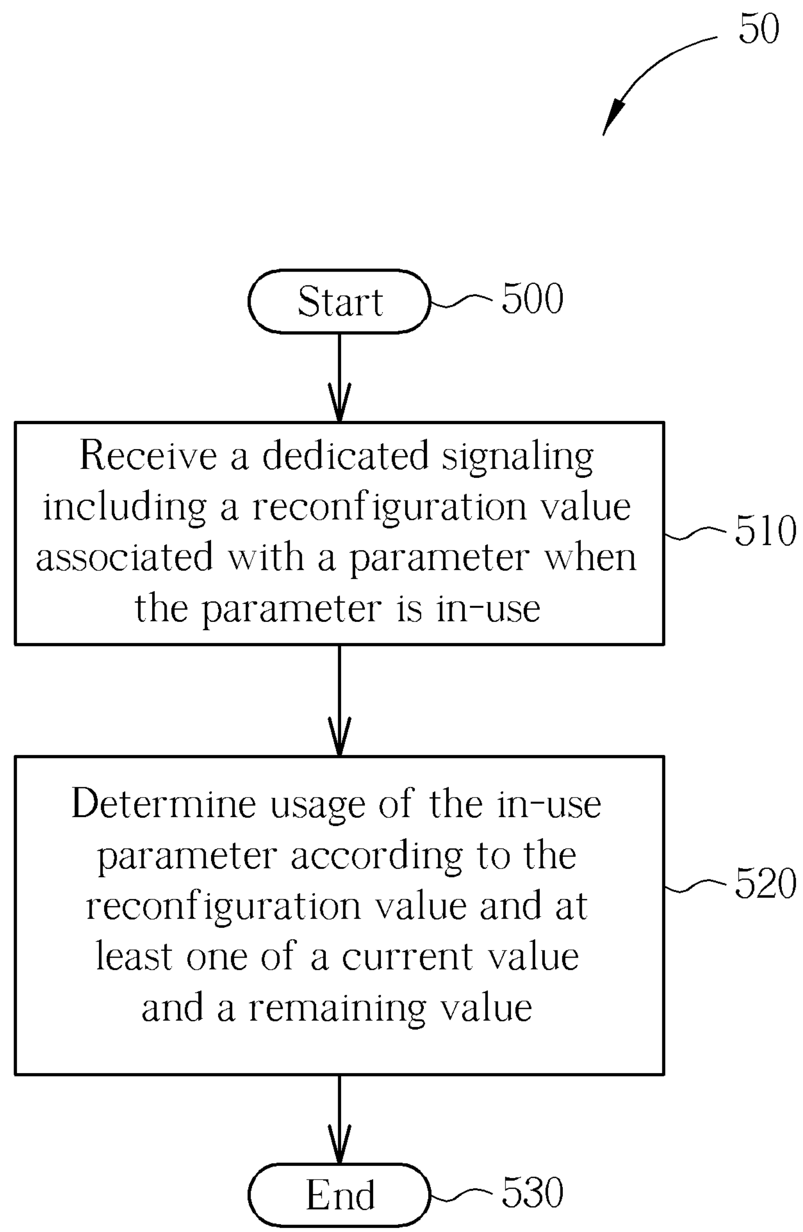

Please refer to FIG. 5, which illustrates a flowchart of a process 50 according to an embodiment of the present invention. The process 50 is utilized for RLC reconfiguration for a UE of a wireless communication system and applied for a timer-like/counter-like parameter normally having an initial value that is usually set to 0 and a target value that can be configured or reconfigured by the network. In addition, a remaining value is a difference value between a current value of the in-use parameter and the currently-expected target value. The "in-use" for a timer or a counter means that the timer is in a running state or the counter is in a counting state. The target value of a timer is an expiry time, whereas the target value of an increasing/decreasing counter is the maximum/minimum value the counter can achieve. The process 50 can be compiled into the program code 214 and includes the following steps:

Step 500: Start.

Step 510: Receive a dedicated signaling including a reconfiguration value associated with a parameter when the parameter is in-use.

Step 520: Determine usage of the in-use parameter according to the reconfiguration value and at least one of a current value and a remaining value.

Step 530: End.

According to the process 50, the UE determines the usage of the in-use parameter according to the reconfiguration value, the current value and the remaining value after the reconfiguration value is received during the in-use of the parameter. More specifically, the UE obtains relationship between the reconfiguration value and the associated values (e.g. the current value only or both of the current and remaining values) and accordingly determines whether to remain or modify the use state of the parameter.

Figure 6:
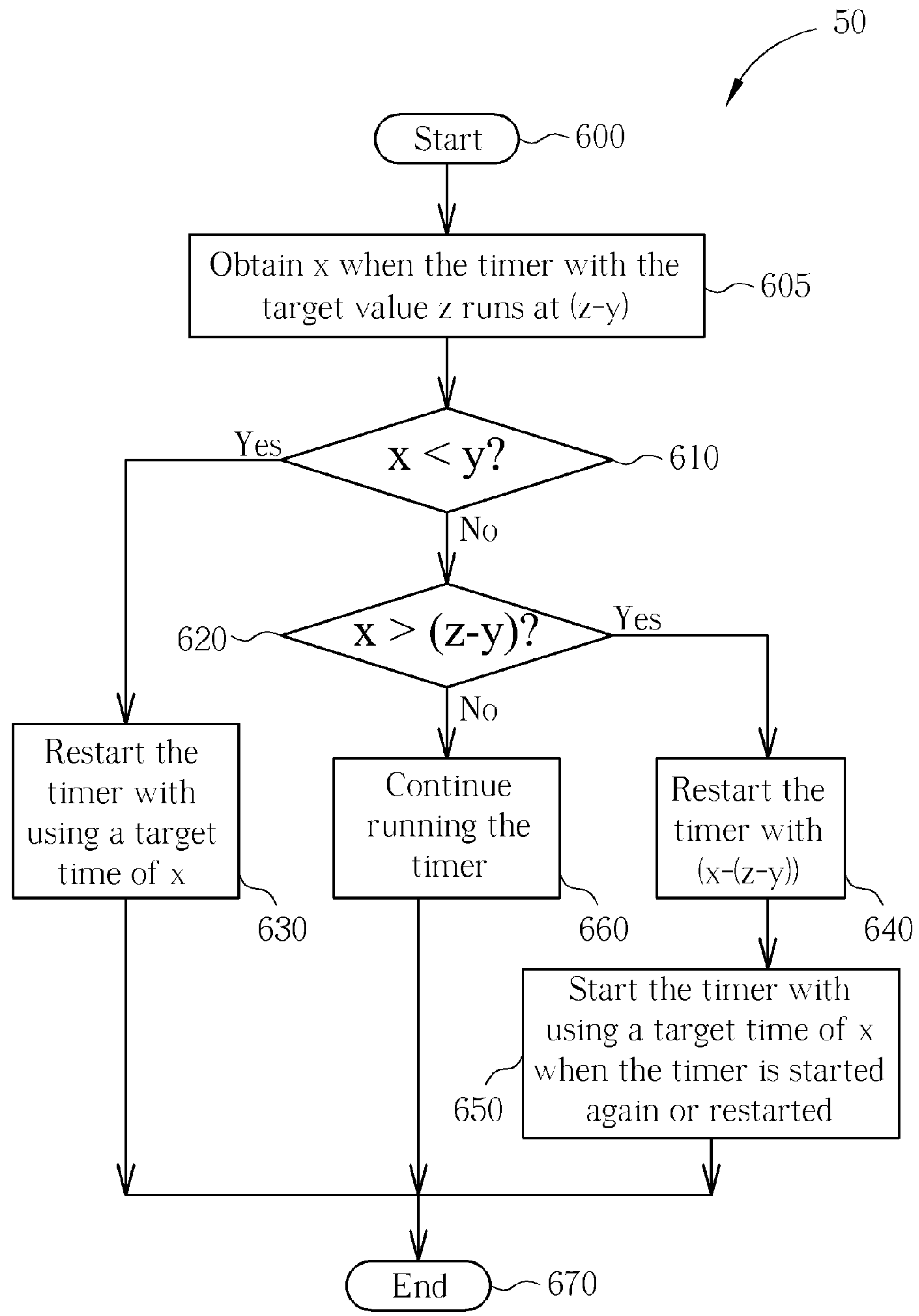

Please refer to FIG. 6, which illustrates a flowchart of a process 60 according to an embodiment of the present invention. The process 60 is made based on the concept of the process 50 for determining usage of a running timer. Assume that the running timer has a target time of z and a remaining time of y, and a reconfiguration value of x is received during the running of the timer. In addition, the timer performs increasing time counting and thereby a current time of the timer is $(z-y)$. The process 60 includes the following steps:

Step 600: Start.

Step 605: Obtain x when the timer with the target value z runs at $(z-y)$.

Step 610: Determine whether x is smaller than y? If so, perform Step 630, else perform Step 620.

Step 620: Determine whether x is larger than $(z-y)$? If so, perform Step 640, else perform Step 660.

Step 630: Restart the timer with using a target time of x and then perform Step 670.

Step 640: Restart the timer with $(x-(z-y))$.

Step 650: Start the timer with using a target time of x when the timer is started again or restarted and then perform Step 670.

Step 660: Continue running the timer.

Step 670: End.

As can be seen from the process 60, the UE uses the reconfiguration value x immediately by restarting the timer with the value x if $x<y$. The $(x<y)$ means that the new running period of the timer is smaller than the current remaining time. Thus, the running time length of the timer is limited to x. Further, the UE may perform the actions specified for the expiry of the timer with the target time z. If $x>(z-y)$, the UE restarts the timer with a value of $[x-(z-y)]$ that is difference between the new running period and the current value. After the timer restarted with $[x-(z-y)]$ expires, the UE starts to use the value x next time the timer is started or restarted. If $x>y$ and $x<(z-y)$, the UE does not modify the usage of the timer and continues running the timer.

Therefore, the UE does not immediately, unconditionally reconfigure the target value from z to x, and thereby avoids an erroneous situation that, when x is larger than y, the timer with the target time of z has its remaining time extended from y to x. Through the process 60, the running timer is properly reconfigured to avoid system errors.

Figure 7:
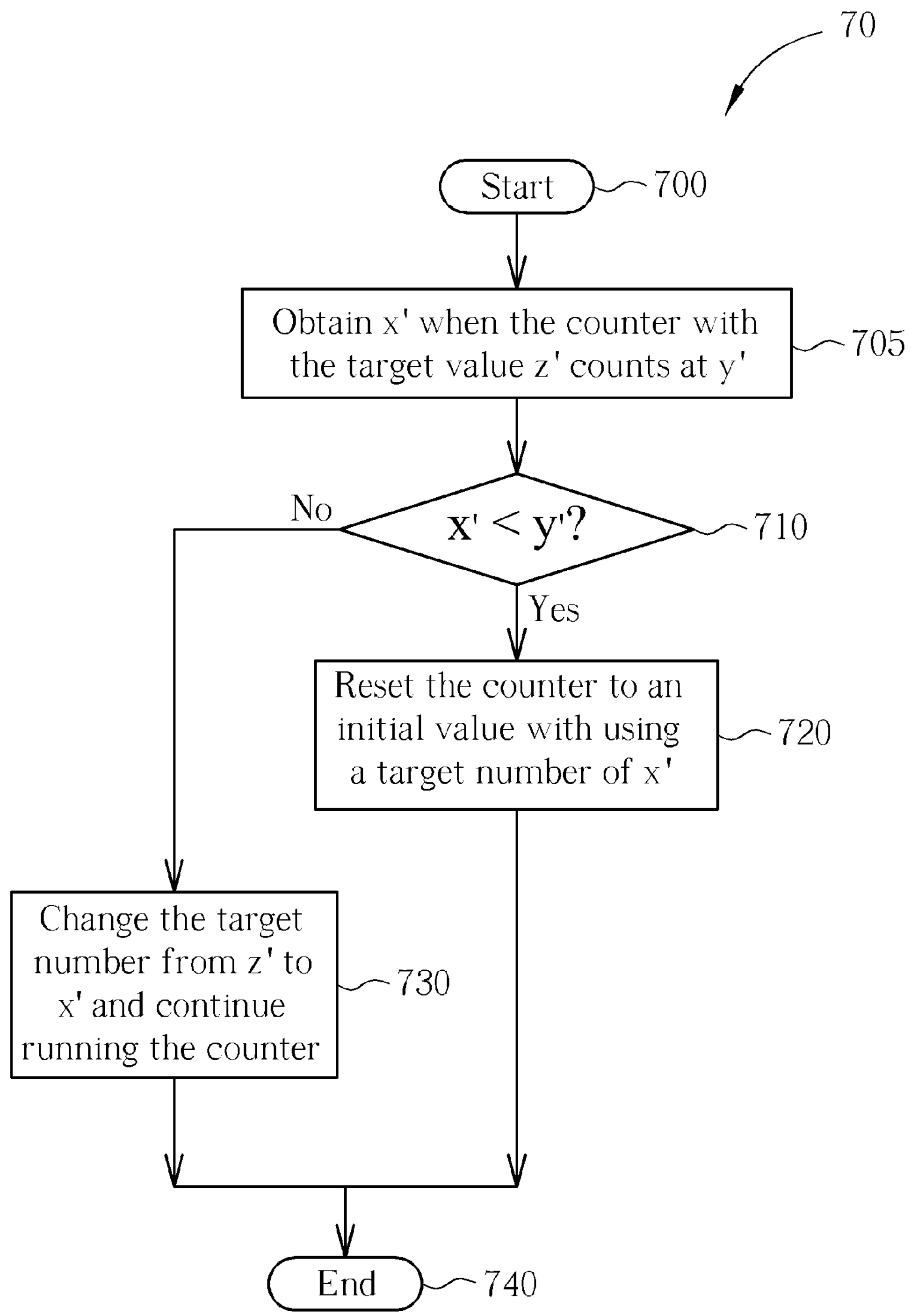

Please refer to FIG. 7, which illustrates a flowchart of a process 70 according to an embodiment of the present invention. The process 70 is made based on the concept of the process 50 for determining usage of a running counter. Assume that the running counter has a target number of z' and a current number of y', and a reconfiguration value of x' is received. In addition, the timer performs increasing counting and thereby target number of z' is the maximum value of the counter. The process 70 includes the following steps:

Step 700: Start.

Step 705: Obtain x' when the counter with the target value z' counts at y'.

Step 710: Determine whether x' is smaller than y'? If so, perform Step 720, else perform Step 730.

Step 720: Reset the counter to an initial value with using a target number of x' and then perform Step 740.

Step 730: Change the target number from z' to x' and continue running the counter.

Step 740: End.

As can be seen from the process 70, the UE resets the counter to an initial value (e.g. 0 or a predefined value) and uses x' as the maximum value if $x'<y'$. Further, the UE may perform the actions previously specified for the counter reaching the maximum value of z'. Otherwise, the UE uses x' as the maximum value and continues running the counter. The process 70 can prevent the immediately-applied value from being larger than the predetermined maximum value.

Figure 8:
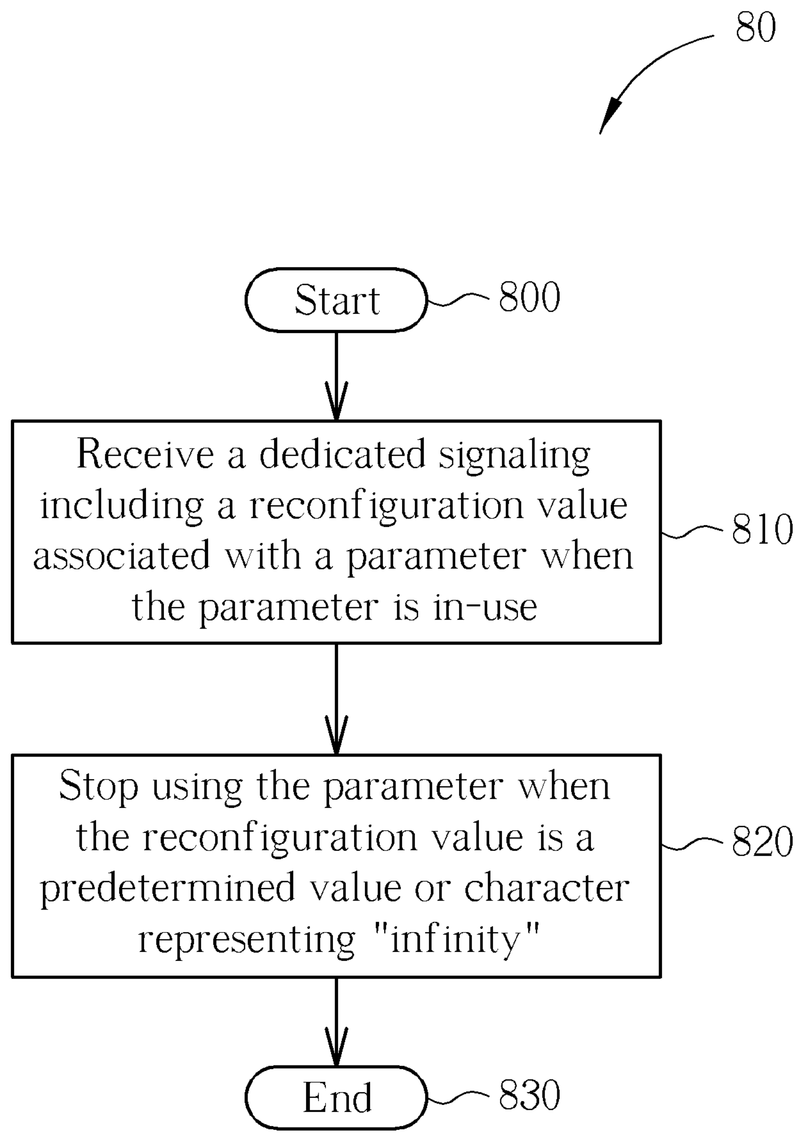

Please refer to FIG. 8, which illustrates a flowchart of a process 80 according to an embodiment of the present invention. The process 80 is utilized for RLC reconfiguration for a UE of a wireless communication system. The process 80 can be compiled into the program code 214 and includes the following steps:

Step 800: Start.

Step 810: Receive a dedicated signaling including a reconfiguration value associated with a parameter when the parameter is in-use.

Step 820: Stop using the parameter when the reconfiguration value is a predetermined value or character representing "infinity".

Step 830: End.

According to the process 80, the UE stops the in-use parameter when the RRC dedicated signaling including a reconfiguration value of "infinity" is received. The "infinity" value can cause severe system errors if being immediately applied. For example the UE stops a running timer used for counting a period of validity of a retransmission when the reconfiguration value for the timer is "infinity" to solve the following problem. If the UE immediately applies the received "infinity" value for a running timer used for counting a period of validity of a retransmission, the timer becomes unstoppable. This means the UE can tolerate a very long time of retransmission failure.

Figure 9:
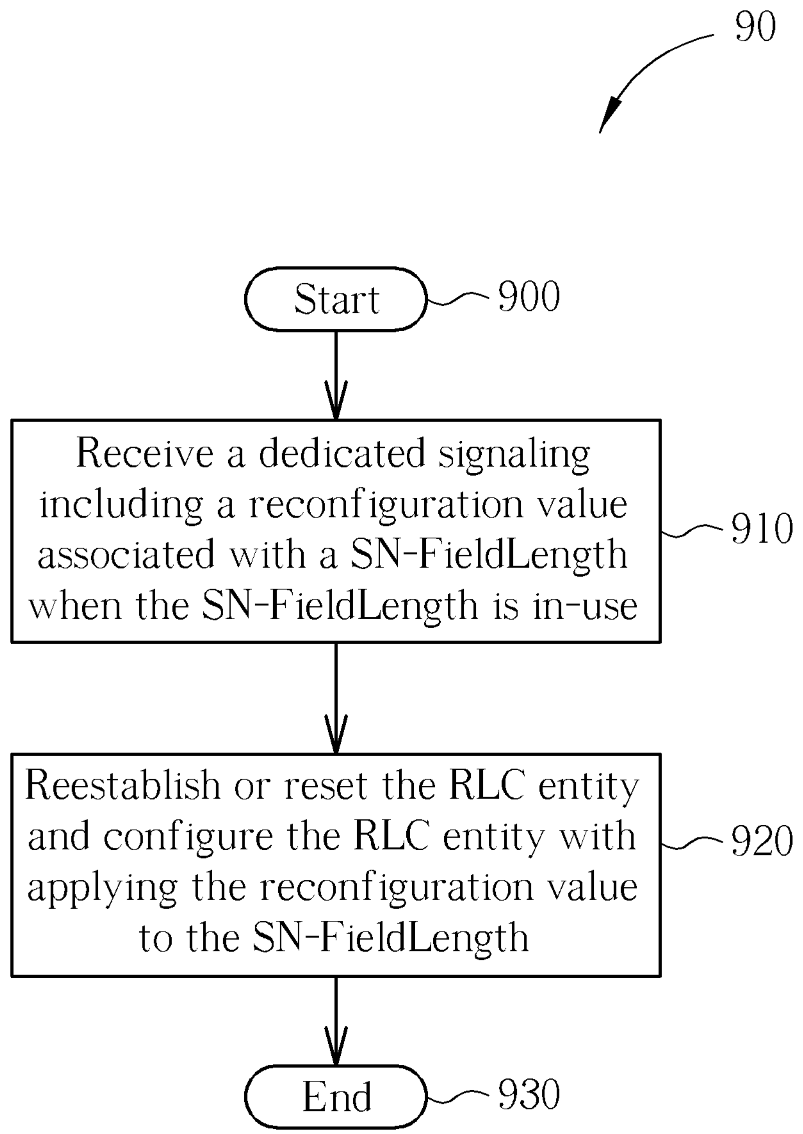

Please refer to FIG. 9, which illustrates a flowchart of a process 90 according to an embodiment of the present invention. The process 90 is utilized for reconfiguration related to a SN-FieldLength parameter of a RLC entity for a UE of a wireless communication system. The SN-FieldLength is a parameter managing a sequence number length in the RLC layer, substantially dominates accurate RLC transmission/retransmission, e.g. what SN of a PDU the UE expects. The process 90 can be compiled into the program code 214 and includes the following steps:

Step 900: Start.

Step 910: Receive a dedicated signaling including a reconfiguration value associated with a SN-FieldLength when the SN-FieldLength is in-use.

Step 920: Reestablish or reset the RLC entity and configure the RLC entity with applying the reconfiguration value to the SN-FieldLength.

Step 930: End.

According to the process 90, when the UE receives the dedicated signaling e.g. RRC connection reconfiguration message to change the value of SN-FieldLength of a RLC entity, the UE resets/re-establishes the RLC entity and configures the RLC entity with applying the reconfiguration value to the SN-FieldLength. Therefore, the UE resets or re-establishes the RLC entity when the value of SN-FieldLength is indicated by the network to be changed, e.g. a size change from 10 to 5 bits.

The process 90 is also applicable to reconfiguration of any logical channel parameter. When the UE receives dedicated signaling including reconfiguration values to change any parameter in the LogicalChannelConfig IE of a RLC entity, the UE resets/re-establishes the RLC entity and configures the RLC entity with the applying the reconfiguration values to the parameters.

In the process 90, entity reset/re-establishment avoids malfunction of the RLC entity caused by the parameter reconfiguration.

Figure 10:
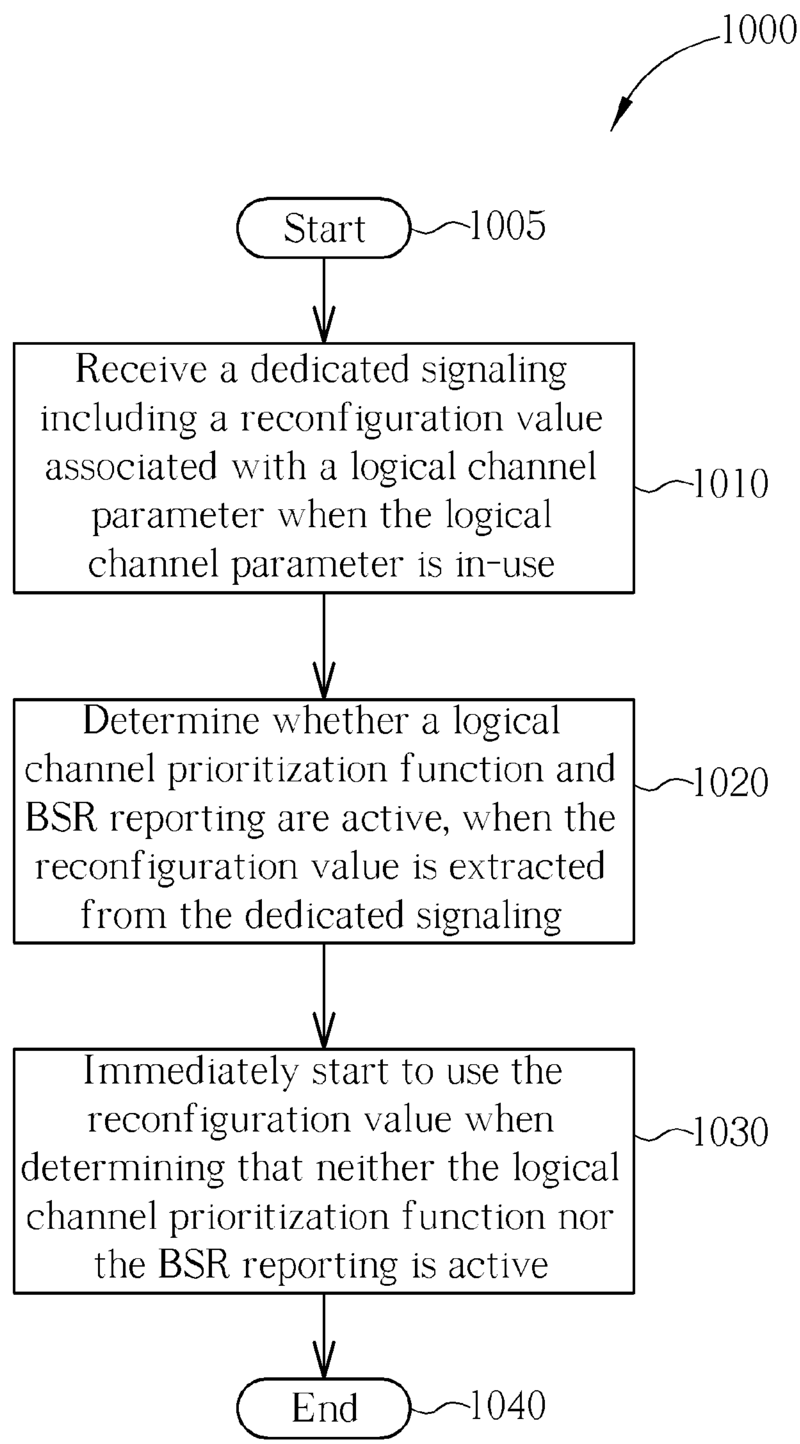

Please refer to FIG. 10, which illustrates a flowchart of a process 1000 according to an embodiment of the present invention. The process 1000 is utilized for RLC reconfiguration for a UE of a wireless communication system. The process 1000 can be compiled into the program code 214 and includes the following steps:

Step 1005: Start.

Step 1010: Receive a dedicated signaling including a reconfiguration value associated with a logical channel parameter when the logical channel parameter is in-use.

Step 1020: Determine whether a logical channel prioritization function and BSR reporting are active, when the reconfiguration value is extracted from the dedicated signaling.

Step 1030: Immediately start to use the reconfiguration value when determining that neither the logical channel prioritization function nor the BSR reporting is active.

Step 1040: End.

According to the process 1000, the UE determines whether the logical channel prioritization function and the BSR reporting of the MAC layer are active, when the reconfiguration value is extracted from the dedicated signaling received during the in-use of the logical channel parameter. For example, the reconfiguration value can be extracted from the LogicalChannelConfig IE included in the RRC connection reconfiguration message. The UE then starts to use the value immediately when neither logical channel prioritization nor BSR reporting is active. The process 1000 prevents the UE from mistakenly modifying the in-use logical channel priority or interfering packet amount calculation for BSR.

Figure 11:
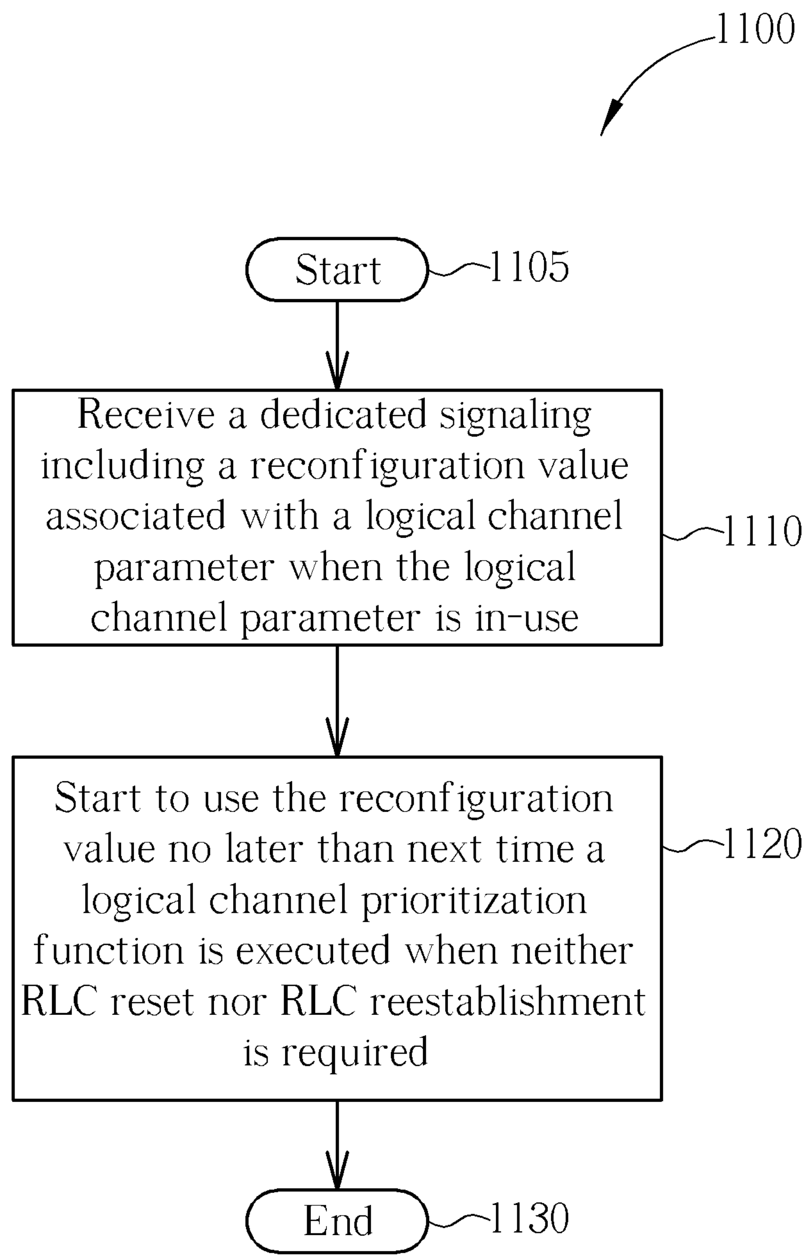

Please refer to FIG. 11, which illustrates a flowchart of a process 1100 according to an embodiment of the present invention. The process 1100 is utilized for RLC reconfiguration for a UE of a wireless communication system. The process 1100 can be compiled into the program code 214 and includes the following steps:

Step 1105: Start.

Step 1110: Receive a dedicated signaling including a reconfiguration value associated with a logical channel parameter when the logical channel parameter is in-use.

Step 1120: Start to use the reconfiguration value no later than next time a logical channel prioritization function is executed when neither RLC reset nor RLC reestablishment is required.

Step 1130: End.

According to the process 1100, after the reconfiguration value related to a logical channel parameter, e.g. a parameter of the LogicalChannelConfig IE of a RLC entity, is received, the UE starts to use the reconfiguration value no later than next time the logical channel prioritization function is executed when neither RLC reset nor RLC reestablishment is required. Using the reconfiguration value no later than next time the logical channel prioritization function is executed ensures that the logical channel prioritization function works complying with the newest requirement of the network.

The concept of the process 1100 is also applicable to the following case. When the UE receives a dedicated signaling including a reconfiguration value for a logicalChannelGroup parameter in the LogicalChannelConfig IE of a RLC entity, the UE starts to use the reconfiguration value next time the BSR reporting is executed when reset/re-establishment of the RLC entity is not required. Since the BSR is used for the network to know how much RLC data the UE attempts to transmit for the next transmission, the UE needs to apply new values in time for generating a correct BSR.

Figure 12:
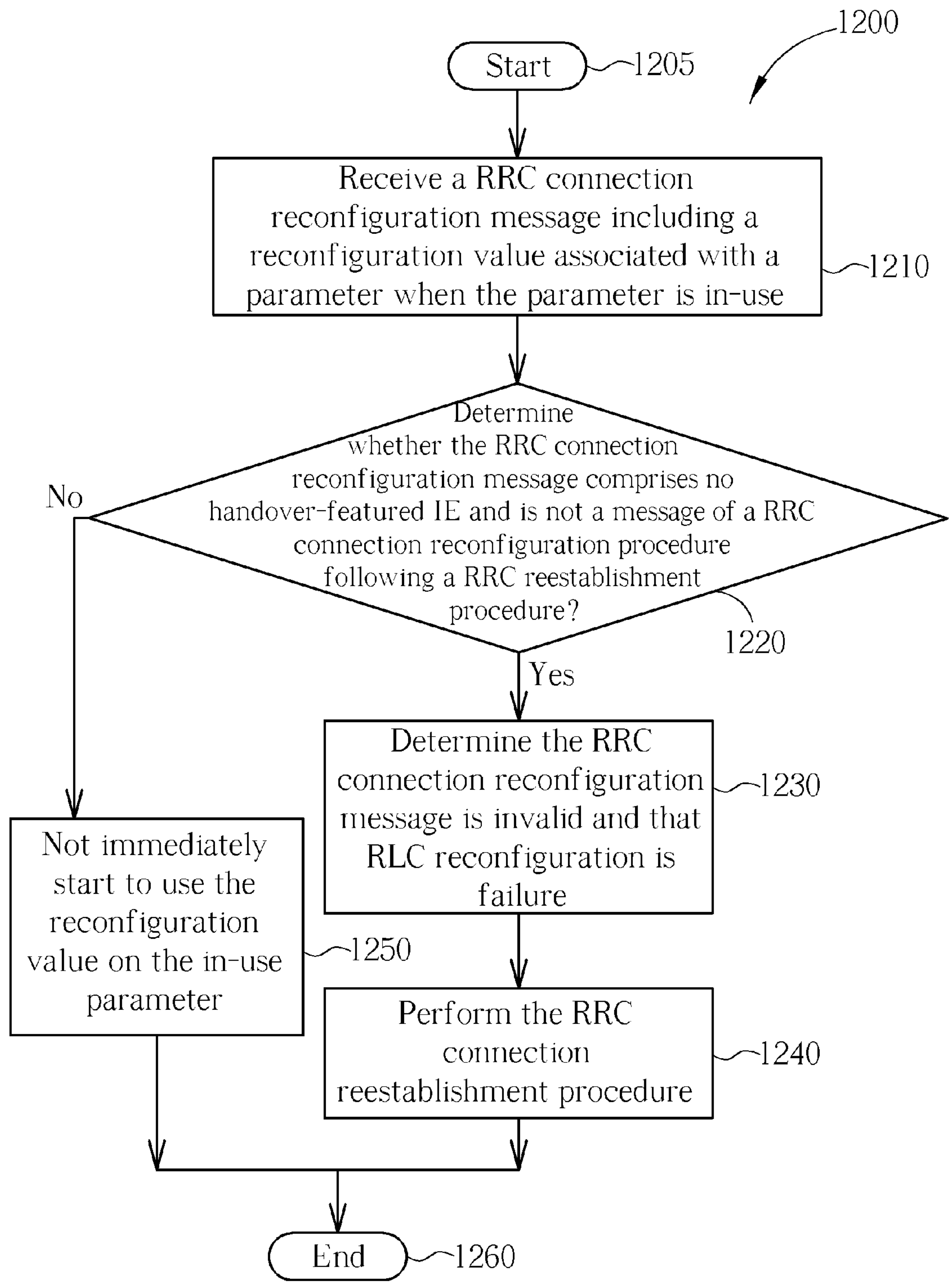

Please refer to FIG. 12, which illustrates a flowchart of a process 1100 according to an embodiment of the present invention. The process 1200 is utilized for RLC reconfiguration for a UE of a wireless communication system. The process 1200 can be compiled into the program code 214 and includes the following steps:

Step 1205: Start.

Step 1210: Receive a RRC connection reconfiguration message including a reconfiguration value associated with a parameter when the parameter is in-use.

Step 1220: Determine whether the RRC connection reconfiguration message comprises no handover-featured IE and is not a message of a RRC connection reconfiguration procedure following a RRC reestablishment procedure? If so, perform Step 1230; else, perform Step 1250.

Step 1230: Determine the RRC connection reconfiguration message is invalid and that RLC reconfiguration is failure.

Step 1240: Perform the RRC connection reestablishment procedure and perform Step 1260.

Step 1250: Not immediately start to use the reconfiguration value on the in-use parameter.

Step 1260: End.

According to the process 1200, when the UE receives the RRC connection reconfiguration message that does not include any handover information and related RRC reconfiguration procedure does not follow the RRC re-establishment procedure, the UE determines that the RRC connection reconfiguration message is invalid and that RLC reconfiguration is failure. Then the UE performs the RRC connection re-establishment procedure to recover the RLC reconfiguration failure. Otherwise, the RRC reconfiguration message is determined to be valid and the reconfiguration value is not immediately started to use the reconfiguration value on the in-use parameter. Details of Step 1250 can refer to the processes 40-1100.

The RRC connection reconfiguration message that does not include any handover information but the reconfiguration value can be a RRC connection reconfiguration message that does not include a "mobilityControlInformation" IE but includes the LogicalChannelConfig or RLC-Config IE. The "mobilityControlInformation" is used to a change of a cell, a carrier frequency, bandwidth, etc. If the UE only applies the RLC parameters/Logical channel parameters without applying configuration of the "mobilityControlInformation", the UE cannot successfully receive packet after the RRC connection reconfiguration procedure. Therefore, the UE considers such a RRC connection reconfiguration message invalid.

Figure 13:
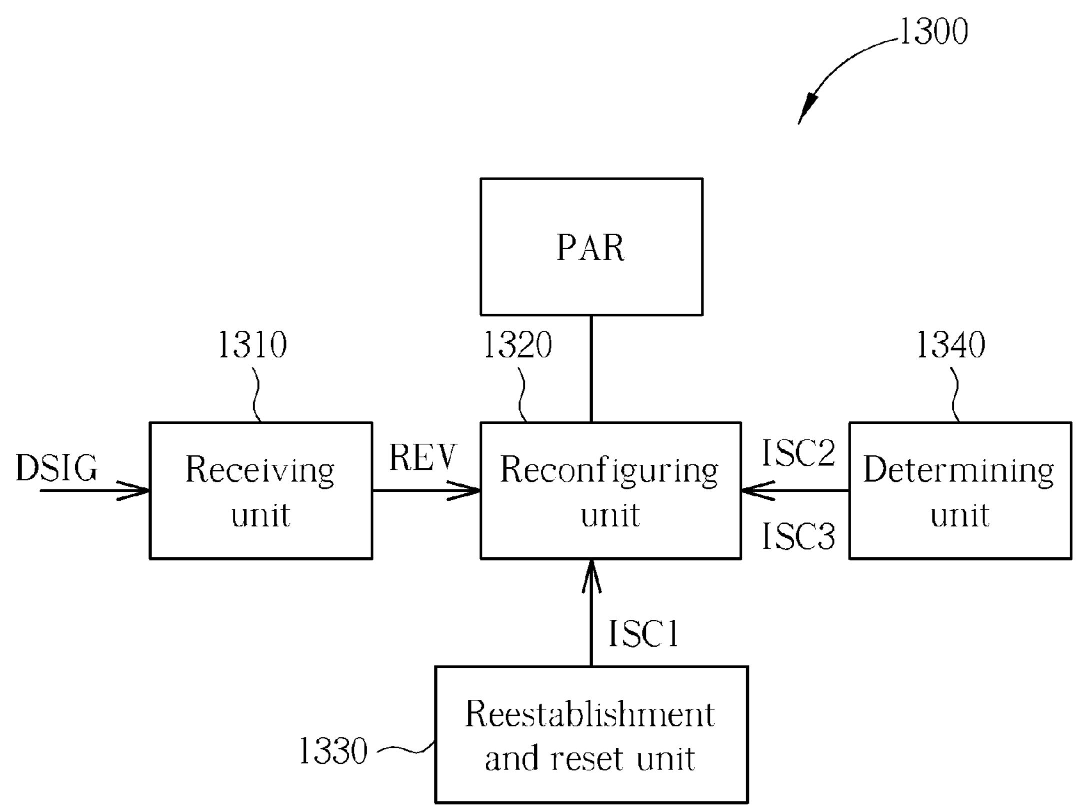
FIG. 13 is a schematic diagram of a communication device according to an embodiment of the present invention.

Please refer to FIG. 13, which illustrates a schematic diagram of a communication device 1300 according to an embodiment of the present invention. The communication device 1300 can be the communication devices shown in FIG. 1 and includes a receiving unit 1310, a reconfiguring unit 1320, a reestablishment and reset unit 1330 and a determining unit 1340. The receiving unit 1310 is used for receiving a dedicated signaling DSIG including a reconfiguration value REV corresponding to a parameter PAR when the parameter PAR is in-use. The parameter PAR, as above mentioned, corresponds to the RLC layer or logical channels. The reestablishment and reset unit 1330 reestablishes or resets a RLC entity of the RLC layer and generates an indication signal ISC1 for the reconfiguring unit 1320 when neither RLC reset nor RLC reestablishment is required. The determining unit 1340 generates an indication signal ISC2 when determining neither a logical channel prioritization function of the logical channels nor BSR reporting is active. Furthermore, the determining unit 1340 determines that the received dedicated signaling DSIG is invalid and that RLC reconfiguration is failure, when the dedicated signaling DSIG is the RRC connection reconfiguration message including no handover-featured IE and is not a message of a RRC reconfiguration procedure following the RRC reestablishment procedure, and thereby generates an indication signal ISC3.

The reconfiguring unit 1320 is mainly used for not immediately starting to use the reconfiguration value REV on the in-use RLC-related parameter when the reconfiguration value REV is extracted from the dedicated signaling. According to the ISC1, the reconfiguring unit 1320 can start to use the reconfiguration value REV no later than next time a logical channel prioritization function is executed when the parameter associates with the logical channel(s) (e.g. the parameter of the LogicalChannelConfig IE). Or, the reconfiguring unit 1320 starts to use the reconfiguration value PAR next time buffer status report reporting is executed according to the indication signal ISC1 when the parameter associates with a logical channel group (e.g. the logicalChannelGroup parameter). According to the indication signal ISC2, the reconfiguring unit 1320 immediately starts to use the reconfiguration value REV when the parameter PAR associates with the logical channel(s).

According to the indication signal ISC3, the reestablishment and reset unit 1330 performs the RRC reestablishment procedure to reestablish or reset the RLC entity, so as to recover the RLC reconfiguration failure.

The communication device 1300 can realize the processes 40-1200, and therefore detailed operation can refer to the abovementioned paragraphs.

In conclusion, the exemplary methods and means are provided to reveal the concept of not immediately starting to use the reconfiguration value on the in-use RLC-related parameter, thereby avoiding errors in the RLC layer, the logical channel management, or a wrong BSR reporting.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of radio link control (RLC) reconfiguration for a communication device of a wireless communication system, the method comprising:

receiving a dedicated signaling including a reconfiguration value corresponding to a RLC-related parameter when the RLC-related parameter is in-use;

when the dedicated signaling comprises a handover-featured information element or the dedicated signaling is a message of a radio resource control (RRC) connection reconfiguration procedure following a RRC re-establishment procedure, determining that the dedicated signaling is valid; and when the dedicated signaling is determined to be valid, starting to use the reconfiguration value on the RLC-related parameter next time the RLC-related parameter is reused, when the reconfiguration value is extracted from the dedicated signaling.

2. The method of claim 1, wherein the RLC-related parameter is a timer, and starting to use the reconfiguration value next time the RLC-related parameter is reused comprises setting the timer according to the reconfiguration value next time the timer is started or restarted.

3. The method of claim 1, wherein the RLC-related parameter is a counter, and starting to use the reconfiguration value next time the RLC-related parameter is reused comprises setting the counter according to the reconfiguration value next time the counter is reset to a predetermined initial value.

4. The method of claim 1, wherein the dedicated signaling is a radio resource control connection reconfiguration message.

5. The method of claim 1, wherein starting to use the reconfiguration value on the RLC-related parameter next time the RLC-related parameter is reused, when the reconfiguration value is extracted from the dedicated signaling comprises:

stopping using the RLC-related parameter when the reconfiguration value is a predetermined value or character representing "infinity".

6. The method of claim 1, wherein starting to use the reconfiguration value on the RLC-related parameter next time the RLC-related parameter is reused, when the reconfiguration value is extracted from the dedicated signaling comprises:

determining usage of the in-use RLC-related parameter according to the reconfiguration value and at least one of a current value of the RLC-related parameter and a remaining value of the RLC-related parameter, wherein the remaining value is difference value between the current value and a target value of the RLC-related parameter corresponding to the current value.

7. The method of claim 6, wherein the in-use RLC-related parameter is a running timer, and the step of determining the usage of the in-use RLC-related parameter according to the reconfiguration value and at least one of the current value and the remaining value comprises:

restarting the timer with the reconfiguration value when the reconfiguration value is smaller than the remaining value;

restarting the timer with a first value of (the reconfiguration value−the current value) when the reconfiguration value is larger than the current value;

starting to use the reconfiguration value next time the timer is started or restarted, after the timer restarted with the first value expires; and continuing running the timer when the reconfiguration value is larger than the remaining value.

8. The method of claim 6, wherein the in-use RLC-related parameter is a running counter, and the step of determining the usage of the in-use RLC-related parameter according to the reconfiguration value and at least one of the current value and the remaining value comprises:

resetting the counter to an initial value and using the reconfiguration value as the target value when the reconfiguration value is smaller than the current value; and using the reconfiguration value as the target value and continuing running the counter when the reconfiguration value is larger than or equal to the current value.

9. The method of claim 1, wherein the RLC-related parameter is a parameter associated with at least a logical channel, and the step of starting to use the reconfiguration value on the RLC-related parameter next time the RLC-related parameter is reused, when the reconfiguration value is extracted from the dedicated signaling comprises:

when the reconfiguration value is extracted from the dedicated signaling, determining whether a logical channel prioritization function of the logical channels and buffer status report (BSR) reporting are active; and immediately starting to use the reconfiguration value when determining that neither the logical channel prioritization function nor the BSR reporting is active.

10. The method of claim 1, wherein the RLC-related parameter is a parameter associated with at least a logical channel, and the step of starting to use the reconfiguration value on the RLC-related parameter next time the RLC-related parameter is reused, when the reconfiguration value is extracted from the dedicated signaling comprises:

starting to use the reconfiguration value no later than next time a logical channel prioritization function of the logical channels is executed when neither RLC reset nor RLC reestablishment is required.

11. The method of claim 1, wherein the RLC-related parameter is a parameter associated with a logical channel group, and the step of starting to use the reconfiguration value on the RLC-related parameter next time the RLC-related parameter is reused, when the reconfiguration value is extracted from the dedicated signaling comprises:

starting to use the reconfiguration value next time buffer status report reporting is executed when neither RLC reset nor RLC reestablishment is required.

12. The method of claim 1 further comprises:

determining that the dedicated signaling is invalid and that RLC reconfiguration is failure, when the dedicated signaling is a radio resource control (RRC) reconfiguration message comprising no handover-featured information element and the RRC reconfiguration message is not a message of a RRC reconfiguration procedure following a RRC reestablishment procedure; and performing the RRC reestablishment procedure to recover the RLC reconfiguration failure.

13. A communication device of a wireless communication system for accurately performing radio link control (RLC) reconfiguration, the communication device comprising:

a non-transitory computer readable recording medium for storing program code corresponding to a process; and a processor coupled to the computer readable recording medium, for processing the program code to execute the process;

wherein the process comprises:

receiving a dedicated signaling including a reconfiguration value corresponding to a RLC-related parameter when the RLC-related parameter is in-use;

when the dedicated signaling comprises a handover-featured information element or the dedicated signaling is a message of a radio resource control (RRC) connection reconfiguration procedure following a RRC re-establishment procedure, determining that the dedicated signaling is valid; and when the dedicated signaling is determined to be valid, starting to use the reconfiguration value on the RLC-related parameter next time the RLC-related parameter is reused, when the reconfiguration value is extracted from the dedicated signaling.

14. The communication device of claim 13, wherein the RLC-related parameter is a timer, and starting to use the reconfiguration value next time the RLC-related parameter is reused comprises setting the timer according to the reconfiguration value next time the timer is started or restarted.

15. The communication device of claim 13, wherein the RLC-related parameter is a counter, and starting to use the reconfiguration value next time the RLC-related parameter is reused comprises setting the counter according to the reconfiguration value next time the counter is reset to a predetermined initial value.

16. The communication device of claim 13, wherein the dedicated signaling is a radio resource control connection reconfiguration message.

17. The communication device of claim 13, wherein starting to use the reconfiguration value on the RLC-related parameter next time the RLC-related parameter is reused, when the reconfiguration value is extracted from the dedicated signaling comprises:

stopping using the RLC-related parameter when the reconfiguration value is a predetermined value or character representing "infinity".

18. The communication device of claim 13, wherein—starting to use the reconfiguration value on the RLC-related parameter next time the RLC-related parameter is reused, when the reconfiguration value is extracted from the dedicated signaling comprises:

determining usage of the in-use RLC-related parameter according to the reconfiguration value and at least one of a current value of the RLC-related parameter and a remaining value of the RLC-related parameter, wherein the remaining value is difference value between the current value and a target value of the RLC-related parameter corresponding to the current value.

19. The communication device of claim 18, wherein the in-use RLC-related parameter is a running timer, and the step of determining the usage of the in-use RLC-related parameter according to the reconfiguration value and at least one of the current value and the remaining value comprises:

restarting the timer with the reconfiguration value when the reconfiguration value is smaller than the remaining value;

restarting the timer with a first value of (the reconfiguration value−the current value) when the reconfiguration value is larger than the current value;

starting to use the reconfiguration value next time the timer is started or restarted, after the timer restarted with the first value expires; and continuing running the timer when the reconfiguration value is larger than the remaining value.

20. The communication device of claim 18, wherein the in-use RLC-related parameter is a running counter, and the step of determining the usage of the in-use RLC-related parameter according to the reconfiguration value and at least one of the current value and the remaining value comprises:

resetting the counter to an initial value and using the reconfiguration value as the target value when the reconfiguration value is smaller than the current value; and using the reconfiguration value as the target value and continuing running the counter when the reconfiguration value is larger than or equal to the current value.

21. The communication device of claim 13, wherein the RLC-related parameter is a parameter associated with at least a logical channel, and the step of starting to use the reconfiguration value on the RLC-related parameter next time the RLC-related parameter is reused, when the reconfiguration value is extracted from the dedicated signaling comprises:

when the reconfiguration value is extracted from the dedicated signaling, determining whether a logical channel prioritization function of the logical channels and buffer status report (BSR) reporting are active; and immediately starting to use the reconfiguration value when neither the logical channel prioritization function nor the BSR reporting is active.

22. The communication device of claim 13, wherein the RLC-related parameter is a parameter associated with at least a logical channel, and the step of starting to use the reconfiguration value on the RLC-related parameter next time the RLC-related parameter is reused, when the reconfiguration value is extracted from the dedicated signaling comprises:

starting to use the reconfiguration value no later than next time a logical channel prioritization function of the logical channels is executed when neither RLC reset nor RLC reestablishment is required.

23. The communication device of claim 13, wherein the RLC-related parameter is a parameter associated with a logical channel group, and the step of starting to use the reconfiguration value on the RLC-related parameter next time the RLC-related parameter is reused, when the reconfiguration value is extracted from the dedicated signaling comprises:

starting to use the reconfiguration value next time buffer status report reporting is executed when neither RLC reset nor RLC reestablishment is required.

24. The communication device of claim 13, wherein the process further comprises:

determining that the dedicated signaling is invalid and that RLC reconfiguration is failure, when the dedicated signaling is a radio resource control (RRC) reconfiguration message comprising no handover-featured information element, and the RRC reconfiguration message is not a message of a RRC reconfiguration procedure following a RRC reestablishment procedure; and performing the RRC reestablishment procedure to recover the RLC reconfiguration failure.

25. A method of radio link control (RLC) reconfiguration for a communication device of a wireless communication system, the method comprising:

when the communication device receives a dedicated signaling including a reconfiguration value associated with a sequence number length of a RLC entity, reestablishing or resetting the RLC entity of the RLC layer, wherein the dedicated signaling indicates the sequence number length of the RLC entity is changed and applying the reconfiguration value to change the sequence number length when the RLC entity is re-established or reset.

26. A communication device of a wireless communication system for accurately performing radio link control (RLC) reconfiguration, the communication device comprising:

a non-transitory computer readable recording medium for storing program code corresponding to a process; and a processor coupled to the computer readable recording medium, for processing the program code to execute the process;

wherein the process comprises:

when the communication device receives a dedicated signaling including a reconfiguration value associated with a sequence number length of a RLC entity, reestablishing or resetting the RLC entity of the RLC layer, wherein the dedicated signaling indicates the sequence number length of the RLC entity is changed;

and applying the reconfiguration value to change the sequence number length when the RLC entity is re-established or reset.

* * * * *